(12) United States Patent
Gutierrez

(10) Patent No.: US 6,426,828 B1
(45) Date of Patent: Jul. 30, 2002

(54) DOPPLER PHASE SHIFTING USING DUAL, SWITCHED PHASE SHIFTING DEVICES

(75) Inventor: Roman C. Gutierrez, La Crescenta, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/479,380

(22) Filed: Jan. 5, 2000

Related U.S. Application Data

(60) Provisional application No. 60/114,901, filed on Jan. 5, 1999.

(51) Int. Cl.$^7$ ................................................ G02F 1/01
(52) U.S. Cl. .................... 359/279; 359/245; 359/285
(58) Field of Search ................................. 359/305, 308, 359/320, 279, 244, 315, 285, 245, 237, 246, 278; 356/356, 28, 28.5; 385/16

(56) References Cited

U.S. PATENT DOCUMENTS 5,774,218 A * 6/1998 Takamiya .................... 356/356

\* cited by examiner

*Primary Examiner*—Hung Xuan Dang
*Assistant Examiner*—Tuyen Tra
(74) *Attorney, Agent, or Firm*—Fish & Richardson P.C.

(57) ABSTRACT

A system of inducing a phase shift using moving reflector elements. The moving reflectors can be moving mirrors or an acousto-optical filter. The moving reflectors oscillate i.e. the move first in a first direction and then in a second direction. Two different reflectors are used so that the light can be switched between the reflectors. During a first portion of the cycle the light is coupled to the first modulator which moves the reflector in the first direction. The second modulator is out of phase with the first modulator, and the light is switched to that second modulator during a second portion of the cycle. The second modulator is also moving in the first direction when the light is applied thereto. In this way, the light obtains a constant direction Doppler shift.

21 Claims, 1 Drawing Sheet

Mach-Zender Switch    Phase Modulator Pair

DOPPLER PHASE SHIFTING USING DUAL, SWITCHED PHASE SHIFTING DEVICES

CROSS-REFERENCE TO RELATED APPLICATIONS

This application claims benefit of U.S. Provisional application No. 60/114,901, filed Jan. 5, 1999.

STATEMENT AS TO FEDERALLY-SPONSORED RESEARCH

The invention described herein was made in the performance of work under a NASA contract, and is subject to the provisions of Public Law 96-517 (U.S.C. 202) in which the Contractor has elected to retain title.

BACKGROUND

Different ways are known of generating a frequency shift in an optical signal. One way of doing this by using an integrated optic acousto-optical tunable filter or AOTF. Such a device uses the acousto-optic effect in a special material, such as Lithium Niobate, to generate an optical frequency shift. A surface acoustic wave transducer is fed by a driving signal, e.g. 210 MHz.

Other ways of creating frequency shifts are desirable.

SUMMARY

The present application teaches an optical signal shifter, formed using two oscillator waveforms that are 180 degrees out of phase. The optical signal is switched between the two waveforms such that each phase modulator is used during its ascending. Hence, the waveform is shifted in the same direction by continually phase shifting between the two driving devices.

BRIEF DESCRIPTION OF THE DRAWINGS

These and other aspects will now be described in detail with respect to the accompanying drawings, wherein.

DETAILED DESCRIPTION

An optical frequency shift can be obtained by reflecting light from a moving target. This creates the so called Doppler shift, in which the frequency is shifted according to well known physical properties. Any moving reflector can be used to create a Doppler shift.

The movements of the reflector create the Doppler shift. When the mirror is moving towards the light source, there is a positive frequency shift. When the reflector moves away from the light source, the frequency is shifted negatively. Hence, when the reflector is constrained to move in a confined space, the reflector moves back and forth, and the frequency shift changes between increasing and decreasing. This thereby creates a series of frequency domain sidebands related to the frequency modulation.

The present application uses an oscillating moving reflector which creates a continuously-changing Doppler shift. The Doppler shift creates a continuous same direction frequency variation.

Figure 1:
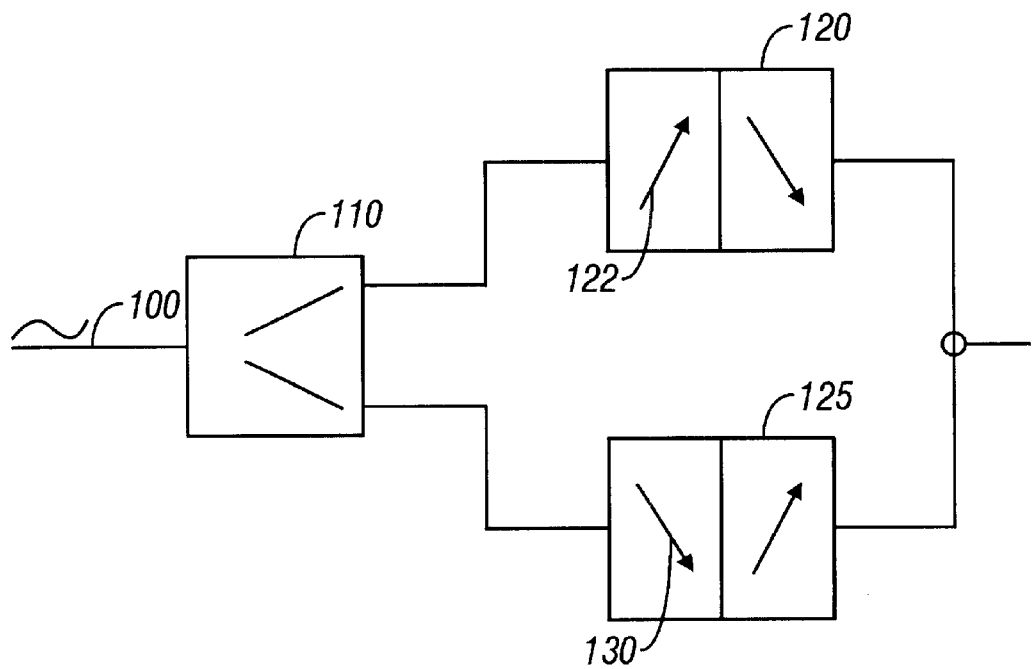
FIG. 1 shows a block diagram of the overall system.

A block diagram of the system is shown in FIG. 1. Input light 100 is coupled to an optical light switch 110 which alternately couples the light to one of a first phase modulator 120 and a second phase modulator 125. The two phase modulators 120 and 125 create Doppler shifts that are out of phase, as shown. The shifts can be 180 degrees out of phase. When modulator 120 is creating the Doppler shift 122 in the upward direction, modulator 125 is at that time creating the Doppler shift in the downward direction 130. Similarly, when the Doppler shift is in the downward direction in modulator 120, it is being created in the upward direction in 125.

The switch 110 alternately connects the light 100 to the two optical modulators 120, 125. The light is alternatively connected to the two modulators. The switch operates such that it is always being connected to the same direction of modulation. The modulator can be a moving mirror, or can be an electro-optical phase modulator as described herein.

The light illuminates the reflector that is moving towards the light source. In the case of the electro optic modulator, this includes the direction of modulation of the modulator. When the mirror begins moving away from the light source, the switch 110 switches to the other modulator. In this way, the light beam will always receive the same direction phase shift. The velocity of the reflectors can be maintained constant, or at some other predetermined level. This thereby keeps the direction of shift frequency constant.

Figure 2:
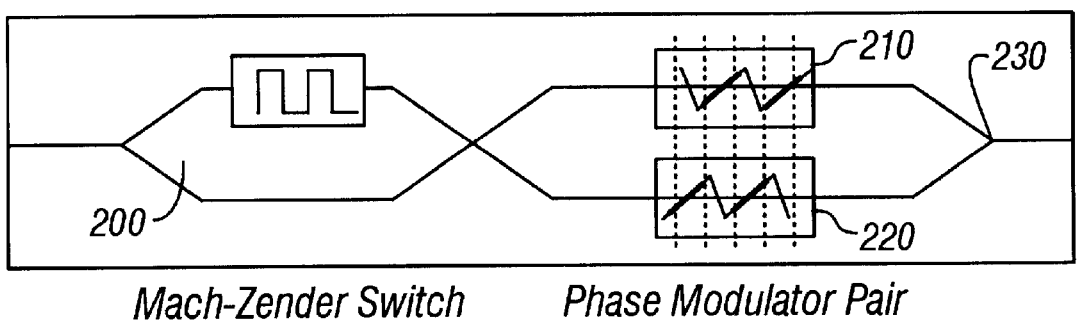
FIG. 2 shows a specific embodiment of the frequency shifter.

A more detailed implementation, showing the detailed structure, is shown in FIG. 2. A Mach-Zehnder switch 200 is used to switch the light between the two reflectors. The switching is phase-synchronized and at that same frequency as the operation of phase modulators. Mach-Zender switch can alternatively be any other type of switch, such as an adiabatic Y-branch switch, or a polarization rotator/splitter combination.

The phase modulators 210, 220 are driven by triangular saw-tooth signals that are 180 degrees out of phase to produce an output 230. The slope of the phase modulation ramp dictates the frequency shift. Hence, if a frequency of phase modulation is 1 GHz, then the frequency shift becomes about 2 GHz.

FIG. 2 shows exemplary saw-tooth waveforms that drive the operation. The dark portions on those waveforms correspond to the phase shift seen by the light based on the switching. The switch changes the light from one channel to the other. Hence the light only sees the positive slope of the saw-tooth modulation in this embodiment. This generates a single frequency shift without harmonics. This allows more of the total time of the waveform to occur during the usable part.

Although only a few embodiments have been described in detail above, other modifications are contemplated.

What is claimed is:

1. A method of inducing a phase shift, comprising:

obtaining a first Doppler shifting element which causes Doppler shifts in a first direction and then subsequently causes Doppler shifts in a second direction;

obtaining a second Doppler shifting element which causes Doppler shifts in said first direction and then shifts in said second direction, wherein said first and second Doppler shifting elements operate out of phase with one another such that at least part of said shifts in said first directions occur at different times; and swithing successively couple input light to said first and second Doppler shifting elements at first and second times, such that shifts to said input light are based on said first direction shifts of said first and second elements at said first and second times.

2. A method as in claim 1 wherein said Doppler shifting elements are moving reflectors.

3. A method as in claim 1 wherein said Doppler shifting elements comprise acousto-optical filters.

4. A method as in claim 3 wherein said acousto-optical filters are driven by waveforms that alternately rise and fall.

5. An method as in claim 4 wherein said waveforms are sawtooth waveforms.

6. A method as in claim 5 wherein said waveforms have a slope in said first direction which is different than a slope in said second direction.

7. A method as in claim 6 wherein said slope in said first direction is more gradual than said slope in said second direction.

8. A method as in claim 4 wherein said waveforms are triangular waveforms.

9. A method as in claim 1, wherein said Doppler shifting elements move in an oscillating motion.

10. A method as in claim 1 wherein said switching uses a Mach-Zehnder switch.

11. A method as in claim 1 wherein said switching uses an adiabatic switch.

12. An optical phase shifter, comprising:
 a first Doppler shifting element which cyclically causes Doppler shifts in a first direction and in a second direction;
 a second Doppler shifting element which cyclically causes Doppler shifts in said first direction and in said second direction;
 a switch which successively coupling input light to said first and second Doppler shifting elements at first and second times, such that said input light is based on said first direction shifts of said first and second elements at said first and second times, and such that said first and second Doppler shifting elements operate out of phase with one another such that at least part of said shifts in said first directions occur at different times.

13. A shifter as in claim 12 wherein said Doppler shifting elements are moving reflectors.

14. A shifter as in claim 12 wherein said Doppler shifting elements comprise acousto-optical filters.

15. A shifter as in claim 14 wherein said acousto-optical filters are driven by waveforms that alternately rise and fall.

16. A shifter as in claim 15 wherein said waveforms are sawtooth waveforms.

17. A shifter as in claim 16 wherein said waveforms have a slope in said first direction which is different than a slope in said second direction.

18. A method as in claim 17 wherein said slope in said first direction is more gradual than said slope in said second direction.

19. A shifter as in claim 15 wherein said waveforms are triangular waveforms.

20. A shifter as in claim 12 wherein said switch is a Mach-Zehnder switch.

21. A shifter as in claim 12 wherein said switch is an adiabatic switch.

* * * * *